(12) United States Patent
Scudder et al.

(10) Patent No.: US 6,351,953 B1
(45) Date of Patent: Mar. 5, 2002

(54) CONTAINER WITH INTEGRAL MODULE FOR HEATING OR COOLING THE CONTENTS AND METHOD FOR ITS MANUFACTURE

(76) Inventors: James A. Scudder, 15968 Grey Stone Rd., Poway, CA (US) 92064; James L. Berntsen, 18369 Chablis Rd., Ramona, CA (US) 92065; William B. Farnham, 847 W. 28th St., San Pedro, CA (US) 90731; Dan Gibbs, 13851 Talca Ave., San Diego, CA (US) 92129; Ann T. Davern; Jerine J. Rosato, both of 4127 Palmetto Way, San Diego, CA (US) 92103; Michael S. Slocum, 11414 Caminito Garcia, San Diego, CA (US) 92131

( * ) Notice: Subject to any disclaimer, the term of this patent is extended or adjusted under 35 U.S.C. 154(b) by 0 days.

(21) Appl. No.: 09/669,493

(22) Filed: Sep. 25, 2000

Related U.S. Application Data

(62) Division of application No. 09/383,977, filed on Aug. 26, 1999.

(51) Int. Cl.7 ................................................. F25D 5/00
(52) U.S. Cl. .............................. 62/4; 62/60; 126/263.08
(58) Field of Search .................... 62/4, 60; 126/263.01, 126/263.05, 263.06, 263.07, 263.08, 263.09

(56) References Cited

U.S. PATENT DOCUMENTS

| | | |
|---|---|---|
| 2,288,895 A | 7/1942 | Fink |
| 2,327,447 A | 8/1943 | O'Brien |
| 2,850,006 A | 9/1958 | Karpalo |
| 2,900,808 A | 8/1959 | Wang |
| 2,926,508 A | 3/1960 | Moon |
| 3,213,932 A | 10/1965 | Gottfurcht |
| 3,369,369 A | 2/1968 | Weiss |
| 3,815,867 A | 6/1974 | Rein et al. |
| 3,842,617 A | 10/1974 | Chase et al. |
| 3,863,832 A  * | 2/1975 | Gordon et al. ................. 229/30 |
| 3,874,557 A | 4/1975 | Porter |

(List continued on next page.)

FOREIGN PATENT DOCUMENTS

| | | |
|---|---|---|
| EP | 0 255 494 | 7/1987 |
| FR | 2 659 940 | 9/1991 |
| GB | 2 131 542 A | 12/1983 |
| WO | WO 93/17928 | 9/1993 |

*Primary Examiner*—William C. Doerrler
(74) *Attorney, Agent, or Firm*—Brown, Martin, Haller & McClain, LLP

(57) ABSTRACT

A container having a container body, a thermic module at one end of the body, and a closure at the other end of the body initiates an internal exothermic (or, alternatively, endothermic) chemical reaction to heat its contents when a user actuates the thermic module. A plastic thermic module body is spin-welded to a plastic container body by rotating one relative to and in contact with the other. The container body has multiple layers, including an inner layer such as a so-called oxygen barrier layer that inhibits oxidation and spoilage of the contents, and spin-welding the container body to the module body seals the otherwise-exposed oxygen barrier layer against air or moisture intrusion. The container includes a rotatable cover adhered to the container end over the closure with heat-sensitive adhesive that prevents a user from accessing the contents until a certain temperature is reached. The thermic module further includes a seal between an inner actuator button and an outer actuator button that seals the thermic module reactants against moisture intrusion prior to use, and is punctured when the thermic module is actuated. The thermic module may also include a filter disposed in interfering relation with the thermic module vents, including a portion between the inner and outer actuator buttons, to block egress of any particles of the solid reactant or the reaction product.

13 Claims, 4 Drawing Sheets

U.S. PATENT DOCUMENTS

| | | |
|---|---|---|
| 3,970,068 A | 7/1976 | Sato |
| 4,511,610 A | 4/1985 | Yazaki et al. |
| 4,640,264 A | 2/1987 | Yamaguchi et al. |
| 4,741,324 A | 5/1988 | Ina et al. |
| 4,762,113 A | 8/1988 | Hamasaki |
| 4,773,389 A | 9/1988 | Hamasaki |
| 4,784,113 A | 11/1988 | Nagai et al. |
| 4,784,678 A | 11/1988 | Rudick et al. |
| 4,793,323 A * | 12/1988 | Guida et al. ............ 126/263.08 |
| 4,816,048 A | 3/1989 | Kimmelshue |
| 4,895,135 A | 1/1990 | Hamasaki |
| 5,088,870 A | 2/1992 | Fukuhara et al. |
| 5,169,524 A | 12/1992 | Meiritz et al. |
| 5,255,812 A | 10/1993 | Hsu |
| 5,461,867 A | 10/1995 | Scudder et al. |
| 5,465,707 A | 11/1995 | Fulcher et al. |
| 5,483,949 A | 1/1996 | James |
| 5,542,418 A | 8/1996 | James |
| 5,555,741 A | 9/1996 | Oakley |
| 5,626,022 A | 5/1997 | Scudder et al. |
| 5,809,786 A | 9/1998 | Scudder et al. |
| 5,941,078 A | 8/1999 | Scudder et al. |
| 5,979,164 A | 11/1999 | Scudder et al. |

* cited by examiner

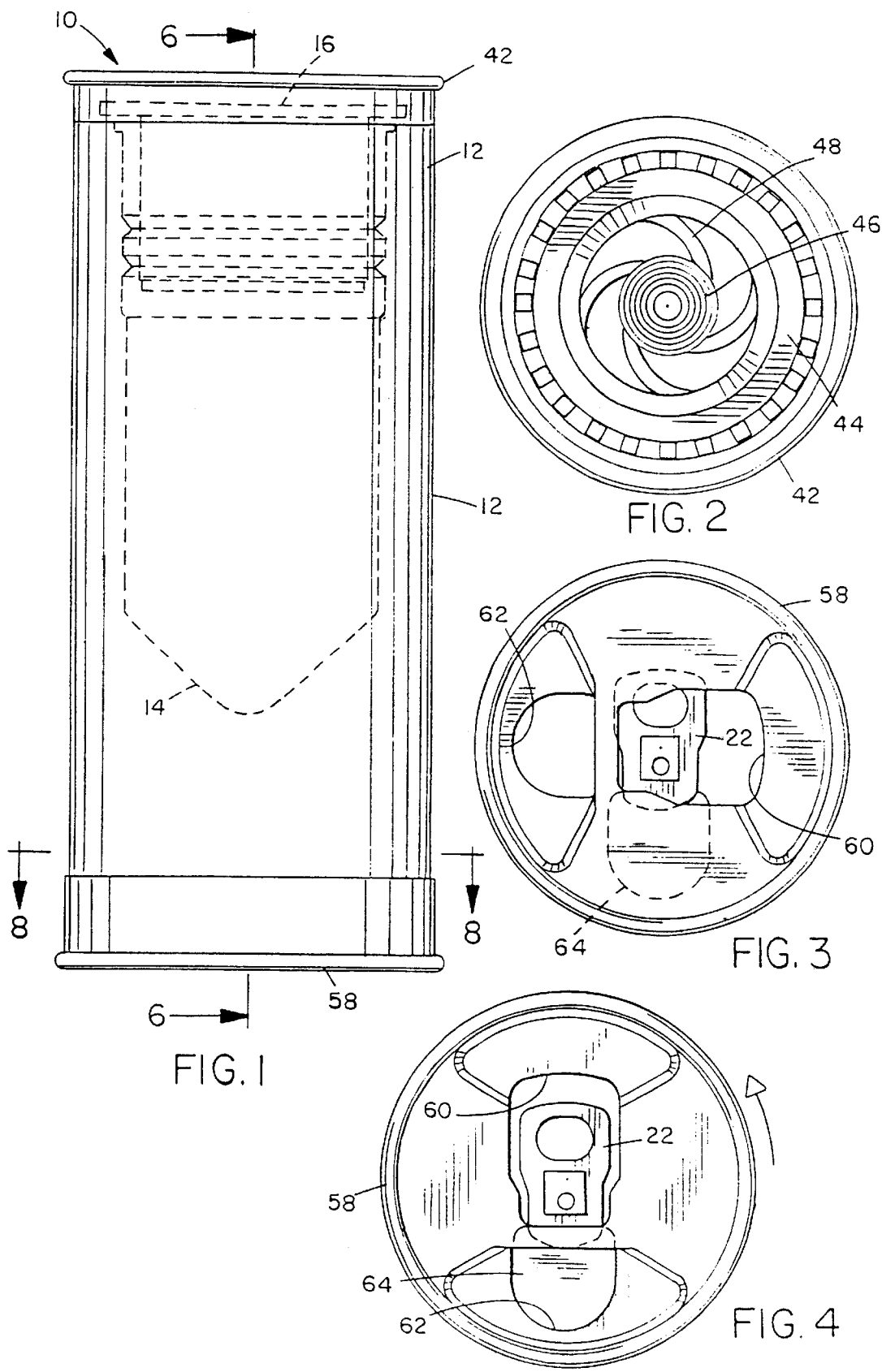

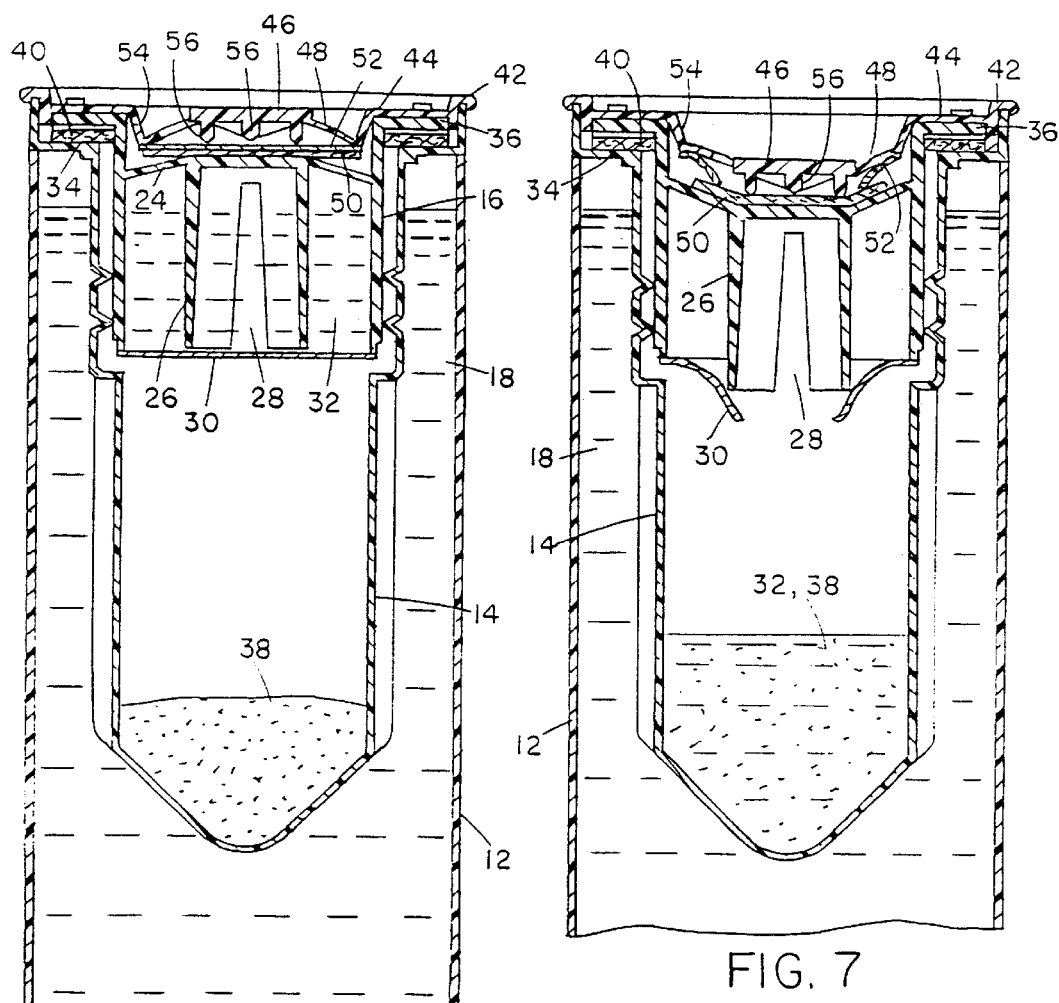
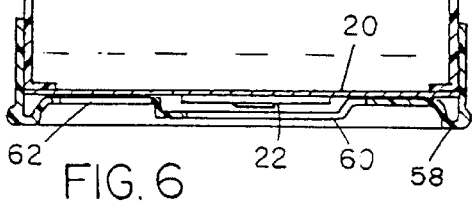
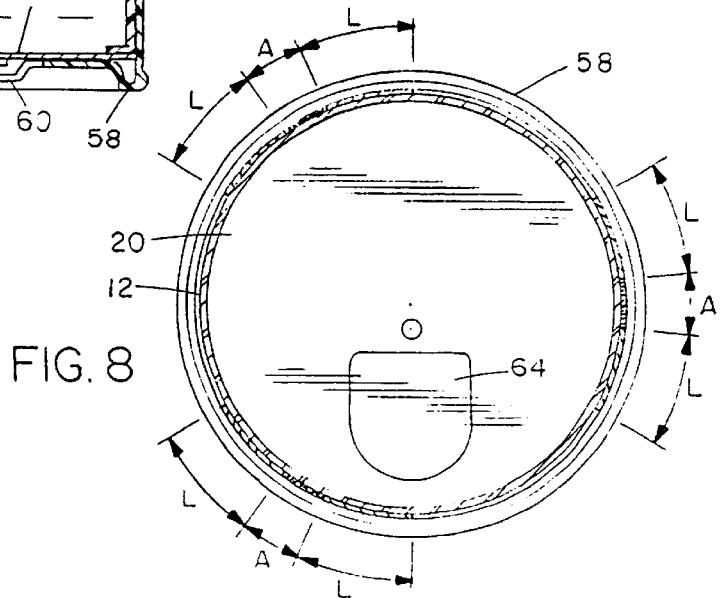

CONTAINER WITH INTEGRAL MODULE FOR HEATING OR COOLING THE CONTENTS AND METHOD FOR ITS MANUFACTURE

CROSS REFERENCE TO RELATED APPLICATIONS

This application is a divisional of U.S. application Ser. No. 09/383,977 filed Aug. 26, 1999.

BACKGROUND OF THE INVENTION

1. Field of the Invention

The present invention relates generally to containers that include an internal module that adds heat to or removes heat from the material, such as a food, beverage, medicine, or the like, in the surrounding container.

2. Description of the Related Art

Containers may have integral modules for warming materials in the container, such as Japanese sake, coffee, or soup. Examples of such self-heating containers are disclosed in U.S. Pat. Nos. 5,461,867 and 5,626,022, issued to Scudder et al. Such containers typically include an outer can or body, in which the food or beverage is sealed, and an inner can or thermic module that contains two chemical reactants that are stable when separated from one another but, when they mix in response to actuation of the thermic module by a user, produce an exothermic reaction or, alternatively, an endothermic reaction and thereby heat or cool the contents of the container.

The heating or cooling module (thermic module) is typically attached at one end of the cylindrical container body, and the elongated cylindrical reaction chamber portion of the module extends into the container body. This elongated portion functions as both a chamber in which to contain the reaction and a heat-exchanger for transferring heat between it and the surrounding contents of the container body. The thermic module has two chambers, each of which contains one of the chemical reactants, separated by a breakable barrier such as metal foil or a thin plastic film. Typically, one of the reactants is a liquid, and the other is in a solid powdered or granular form. Calcium oxide and water are examples of two reactants known to produce an exothermic reaction to heat the contents in such containers. Other combinations of reactants are known to produce endothermic reactions to cool the container contents. A cap containing the liquid reactant is disposed in the end of the thermic module attached to the container body. At one end of the cap is an actuator button that a user may press to initiate the heating or cooling. The barrier seals the other end of the cap. The cap has a pushrod or similar prong-like member that extends from the actuator button nearly to the barrier. Depressing the actuator button forces the prong into the barrier, puncturing it and thereby allowing the liquid reactant to flow into the solid reactant in the reaction chamber. The heat produced by the resulting exothermic reaction or used by the resulting endothermic reaction is transferred between the reaction chamber of the thermic module and the contents of the container body by conduction. Exothermic reactions also typically generate a gas and/or steam, which is allowed to escape through vents in the end of the container. The user inverts the container and, when the contents have reached the desired temperature, consumes the contents. The second end of the container body has a seal or closure, such as a conventional beverage can pull-tab, that may be opened and through which the user may consume the heated or cooled contents.

A portion of the thermic module, such as the elongated cylindrical reaction chamber, may be unitarily formed with the outer can, as illustrated, for example, in U.S. Pat. No. 3,970,068, issued to Sato, and U.S. Pat. No. 5,088,870, issued to Fukuhara et al. The unitary container body is formed by providing a metal cylinder that is open at one end and closed at the other, and punching or deep-drawing a cavity in the closed end. A cap containing the liquid reactant is attached to the open end of the cavity. In other such containers, however, the elongated cylindrical reaction chamber may be separately formed and then attached to the container body by another manufacturing step. It would be desirable to provide an economical and reliable method for manufacturing this latter type of container.

Another problem associated with self-heating and self-cooling containers is that a person may attempt to consume the contents before the contents have been fully heated or cooled. That the person may be displeased by the resulting temperature of the beverage or other contents is not the only effect. A perhaps more serious effect is that a self-heating container may overheat and present a burn hazard if, after the user empties it of its contents, it continues to generate heat, because the contents act as a heat sink. It would be desirable to provide a self-heating container that inhibits a user from consuming the contents before the heating reaction has completed.

As disclosed in the above-referenced U.S. patents, the actuator button may be protected by a foil safety seal. An unbroken seal assures a person that the container has not been actuated and is thus ready for use. Also, the reactivity of typical chemicals such as calcium oxide may decrease if they absorb atmospheric moisture, such as could occur if the container were in storage or in transit for prolonged periods in a moist environment prior to use, and the seal inhibits exposure of the reactants to atmospheric moisture. To use the container, the user peels the foil seal off the container and discards it. The removal of the foil seal presents a disposal problem because the user may not be within a convenient distance of a trash receptacle. It would further be desirable to minimize disposal problems associated with self-heating and self-cooling containers.

These problems and deficiencies are clearly felt in the art and are solved by the present invention in the manner described below.

SUMMARY OF THE INVENTION

The present invention relates to a container having a container body, a thermic module at one end of the body, and a closure at the other end of the body. The body may have any suitable generally tubular shape, such as cylindrical or can-shaped or bottle-shaped. The food, beverage, medicine or other material to be heated or cooled is contained in a material cavity in the container body. The thermic module contains a chemical reactant that is segregated from another reactant in the container. When a user actuates the thermic module, the reactants mix and produce a reaction that, depending upon the reactants, either produces heat, i.e., an exothermic reaction, and thereby heats the container contents, or uses heat, i.e., an endothermic reaction, and thereby cools the container contents.

In accordance with one aspect of the present invention, a plastic thermic module body is spin-welded to a plastic container body by rotating one relative to and in contact with the other. The frictionally generated heat fuses or welds the contacting plastic surfaces together. The container body may have multiple layers, including an oxygen and flavor scalping barrier layer that inhibits oxidation and spoilage of the contents. Spin-welding the container body to the module body in this manner seals the portion of the inner layer that is exposed at the annular end of the container body between two plastic layers and thereby prevents air or moisture from seeping past the outer plastic layer and into the inner layer.

In accordance with another aspect of the present invention, the container includes a movable cover mounted over the closure. A suitable heat-sensitive adhesive between the cover and the container inhibits movement of the cover until the temperature has reached a certain threshold. The adhesive bond softens when the adhesive reaches approximately that temperature. In an exemplary embodiment of the invention, the cover is rotatable. The cover has an opening, and when the threshold temperature is reached, the user can rotate the cover until the opening is aligned with the closure. The user may then open the closure and consume the contents of the container.

In accordance with still another aspect of the invention, the thermic module includes a seal, such as a foil disc, between an inner actuator button and an outer actuator button. The inner actuator button may be included in a module cap that holds the solid reactant. The outer actuator button has one or more apertures and also has one or more prongs directed toward the seal. When the user presses the outer actuator button, the prong punctures the seal. This actuator structure eliminates the disposal problem associated with a removable foil seal. In addition, if for some reason the module cap were to become overpressurized prior to use, the pressure would force the inner actuator button against the seal. The seal, in turn, presses against the prong and punctures it, thereby relieving the pressure through the apertures in the outer actuator button.

The thermic module may also include a filter disposed in interfering relation with the vents between the inner and outer actuator buttons to block egress of any particles of the solid reactant or the reaction product, and also absorbs water (gaseous and liquid) during the reaction. The filter may include a disc-shaped portion between the inner and outer actuator buttons and an annular portion between flanges coupled to the actuator buttons. The disc-shaped portion may be integrally formed with the annular portion prior to assembly of the container and separated from one another along an annular perforation line during a manufacturing step in which the filter portions are inserted into the thermic module.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein:

FIG. 1 is a side view of a container of the present invention;

FIG. 2 is a bottom view of the container;

FIG. 3 is a top view of the container with the cap in the closed position;

FIG. 4 is a view similar to FIG. 3, with the cap rotated to the opened position;

FIG. 6 is a sectional view taken on line 6—6 of FIG. 1;

FIG. 7 is a similar sectional view showing the container after actuation;

FIG. 8 is a sectional view taken on line 8–18 of FIG. 1;

DESCRIPTION OF PREFERRED EMBODIMENTS

Figure 5:
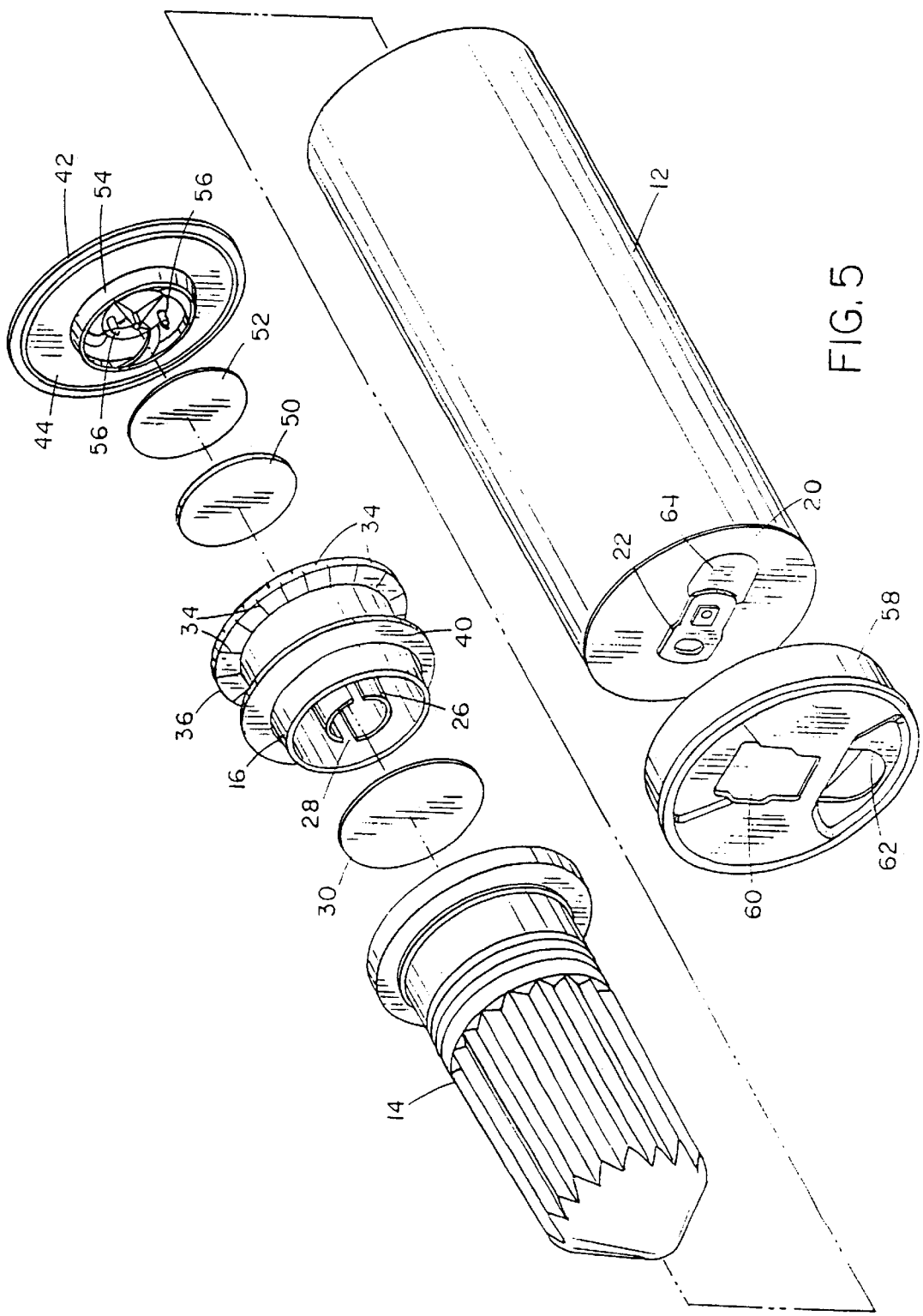
FIG. 5 is an exploded perspective view of the elements of the container.
Figure 9:
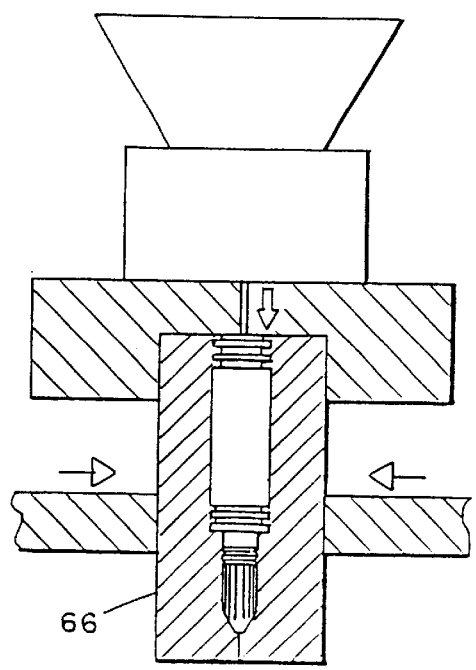
FIG. 9 illustrates the manufacturing step of blow-molding the plastic body elements of the container.

As illustrated in FIGS. 1–8, a container 10 includes a container body 12, a thermic module body 14, and a thermic module cap 16. As best illustrated in FIGS. 5–7, module body 14 has an elongated heat-exchanger portion that extends into container body 16. The interior of this portion defines a reaction chamber in which the reaction occurs that heats (or, in alternative embodiments of the invention, cools) the beverage or other contents 18. The heat-exchanger portion has a corrugated or pleated wall to increase surface area and, as a result, heat transfer. Although in the illustrated embodiment the wall is corrugated or pleated, in other embodiments the wall may have other suitable geometries. Module cap 16 is press-fit in the open end of module body 14. An endcap 20 with a pop-tab closure 22 of the type commonly used in beverage cans is crimped over the other end of container body 12 in the manner of a conventional beverage can.

Module cap 16 is of unitary construction and is made of a semi-rigid plastic, such as high density polyethylene. Module cap 16 has a disc-shaped or dome-shaped inner actuator button 24 and a cylindrical prong 26 with an elongated notch 28. A breakable reactant barrier 30 made of metal foil is adhesively attached to the open end of module cap 16 to seal the water or other liquid reactant 32 inside.

Module cap 16 has multiple vent channels 34 distributed around its outside surface. When module cap 16 is fit in the open end of module body 14, each of vent channels 34 provides a channel through which gas can escape during the reaction. Vent channels 34 extend longitudinally along the outside surface of the body portion of module cap 16, change direction to extend radially along the lower surface of the flange portion 36 of module cap 16, change direction again to extend longitudinally along the outside cylindrical surface of flange portion 36, and change direction again to extend radially along the upper surface of flange portion 36. This long, narrow, zig-zag path of channels 34 inhibits escape of particles of the calcium oxide or other solid reactant 38 while allowing gas to vent.

A filter ring 40 is sandwiched between flange portion 36 and thermic module body 14. Filter ring 40 further prevents solid particles from escaping through vent channels 34 while allowing gases to vent unimpeded. Filter ring 40 may be made of any suitable filter material such as synthetic sponge, open-cell foamed rubber, or any woven or fibrous materials such as paper and cloth. A suitable material is commercially available from Filter Material Corporation of Wisconsin under the product number AC20.

An outer actuator assembly 40 is attached to the end of container body 12 and, as best illustrated in FIG. 2, includes a ring portion 44 and an outer actuator button 46. The ring of squares shown around the outer periphery of ring portion 44 in FIG. 2 are surface features that facilitate spin-welding outer actuator assembly 42 to the end of container body 12 as described below. Outer actuator button 46 is supported on at least three but preferably four spline-shaped fingers 48, suspending it in a resiliently deflectable manner within the interior of ring portion 44. Outer actuator button 46, fingers 48 and ring portion 44 are preferably unitarily formed as a molded plastic part. The concentric rings shown within outer actuator button 46 in FIG. 2 are surface features that provide a frictional grip for user's finger when actuating the container as described below. A filter disc 50, preferably made of the same material as filter ring 40, is sandwiched between outer actuator assembly 42 and inner actuator button 24. Although filter ring 40 provides an adequate filter by itself, filter disc 50 may be included in certain embodiments of the invention to further enhance filtering. An advantage in manufacturing economy may be achieved in such embodiments by forming filter ring 40 and filter disc 50 as a unitary part with perforations between them, and handling them as a unitary part until they are separated during the manufacturing step in which they are assembled into container 10.

As illustrated in FIGS. 5–7, outer actuator assembly 42 further includes an breakable actuator barrier 52. Breakable actuator barrier 52 is preferably made of metal foil that is adhesively attached to the end of an annular cuff portion 54 projecting from the interior periphery of ring portion 44. Three pointed projections 56 extend from the underside of outer actuator button 46 toward actuator barrier 52. The star-shaped or x-shaped surface feature centered at the middle one of projections 56 reinforces outer actuator button 46 but is not otherwise significant to the invention.

As illustrated in FIGS. 3–5, lid 58 is mounted over endcap 20 and the end of container body 12. Lid 58 has two apertures 60 and 62. As illustrated in FIG. 8, lid 58 is mounted to the end of container body 12 with patches or spots of heat-sensitive adhesive (labeled "A") having an adhesion strength that, generally speaking, decreases with an increase in temperature. Thus, the adhesive immobilizes lid 58 until container 10 is actuated and produces heat. A range of such heat-sensitive adhesives are commercially available with various specifications. One parameter that can typically be specified is the threshold temperature at which the adhesive loses (or, conversely, achieves) substantial adhesion strength. Suitable adhesives are manufactured by National Starch and Chemical of Illinois under the product numbers 34-2780 and 70-4467. Although its precise formulation is proprietary to the manufacturer, the manufacturer describes the adhesive as starch-based. Before a user actuates container 10, cap 58 is in the position shown in FIG. 3. In this position aperture 60 is not aligned with pop-tab closure 22 and thus prevents a user from opening closure 22. Also, in this position aperture 62 is not aligned with the sealed opening 64 through which beverage 18 can be consumed. When container 10 heats and the adhesive reaches the threshold temperature, it loses sufficient adhesion strength that a user can move cap 58. The user rotates cap 58 until it is in the position shown in FIG. 4, as indicated by the arrow. In this position aperture 60 is aligned with pop-tab closure 22, thereby allowing the user to open it. Also, in this position aperture 62 is aligned with the sealed opening through which the user can consume the beverage. As in a conventional soft drink can, opening pop-tab closure 22 breaks the seal and allows a user to drink beverage 18 through the resulting opening. The user's lips contact the relatively cool plastic of cap 58 rather than the potentially very hot metal of endcap 20.

Although exactitude in the threshold temperature is not necessary for the invention to work properly, it is preferable in a container for a beverage such as coffee or tea that the adhesive maintains substantial adhesion when its temperature is below about 100 degrees Fahrenheit (38 Celsius) and loses substantial adhesion when its temperature exceeds said this threshold. The preferred adhesive noted above that is manufactured by National Starch and Chemical has this property. For purposes of this patent specification, the term "substantial adhesion" refers to the inability of a user to rotate lid 58 by exerting no more than the normal amount of torque that a person typically exerts when opening a jar or other screw-top food or beverage container without the assistance of tools. Although the adhesion strength of such adhesives continues to decrease to some extent with an increase in temperature over a fairly wide range, the adhesion strength decreases much more sharply at the threshold temperature than at other temperatures in the range.

To actuate container 10, the user depresses outer actuator button 46 by exerting a force upon it in the general direction of the longitudinal axis of container 10. As noted above, actuator button 46 is suspended by fingers 48, which resiliently deflect to allow button 46 to move in this axial direction. The force exerted upon outer actuator button 46 urges its projections 56 into actuator barrier 52, puncturing it. The force further urges outer actuator button 46 toward inner actuator button 24, which in turn is urged in the same axial direction. Inner actuator button 24 is flexible and responds to the force by popping or snapping inwardly toward reactant barrier 30.

In response to the inward flexure of inner actuator button 24, the distal end of prong 26 punctures reactant barrier 30. Water 32 flows through punctured reactant barrier 30 and mixes with solid reactant 38 in the reaction chamber, i.e., the interior of the elongated portion of thermic module body 14. Notch 28 in prong 26 facilitates the flow of water 18 into the reaction chamber. The resulting exothermic reaction produces heat, which is transferred to beverage 18 by conduction through the pleated wall of the heat-exchanger portion of thermic module body 14. As noted above, in other embodiments of the invention, other reactants may be selected that give rise to an endothermic reaction when mixed.

Gas or steam produced in the reaction escapes the reaction chamber through vent channels 34, but any solid particles are filtered out by filter ring 40 or filter disc 50. Note that the inherent saturation of filter ring 40 and filter disc 50 by the escaping steam may enhance this filtration. The gas or steam that passes through filter ring 40 or filter disc 50 passes through the punctured actuator barrier 52 and exits container 10 through the spaces between fingers 48.

The user can then invert container 10 and wait until the reaction heats beverage 18, which typically occurs within about five minutes in a container 10 having a capacity of 10 fluid ounces (296 ml) of water or comparable beverage such as coffee or tea. As described above, when beverage 18 is heated to the temperature at which it is to be consumed, the adhesive has loosened sufficiently to allow the user to rotate cap 58. Patches or spots of a suitable lubricant (labeled "L" in FIG. 8) are interspersed with the adhesive patches so that when cap 58 is rotated the lubricant smears and prevents the adhesive from re-adhering cap 58 as it begins to cool and also allows the user to more easily rotate cap 58. The lubricant is preferably food-grade or approved for incidental food contact by the appropriate governmental authority, such as the Food and Drug Administration in the United States. The user then opens pop-tab closure 22 as described above and consumes beverage 18.

The method of manufacturing container 10 may include the steps illustrated in FIGS. 9, 10 and 11A–C. The manufacturing method is an important aspect of the invention because it addresses several problems. Container body 12 and thermic module body 14 are preferably made of multiple layers, including an oxygen-barrier layer, to maintain the freshness and stability of beverage 18 or other contents. Such multiple-layer plastic container technology is familiar to persons of skill in the art to which the invention relates and is described in, for example, *Blow Molding Handbook*, edited by Donald Rosato and Dominick Rosato, Hanser Publishers. As known in the art, a multiple-head blow-molding machine such as that illustrated in FIG. 9 can be used to produce multiple-layer plastic containers. In accordance with the blow-molding method, the machine positions a suitable mold 66 beneath the blow-molding head (known as a W. Müeller head), extrudes the plastic resin layers simultaneously, and then injects air to conform the plastic to the contours of the mold cavity. The machine then cools the mold, opens it, removes the molded part, and repeats the process. A suitable blow-molding machine is commercially available from B&W of Berlin, Germany under the name/ Model No. DE3000. Although this machine can work with two or more molds simultaneously, this aspect is not particularly relevant to the manufacturing method of the present invention.

Figure 10:
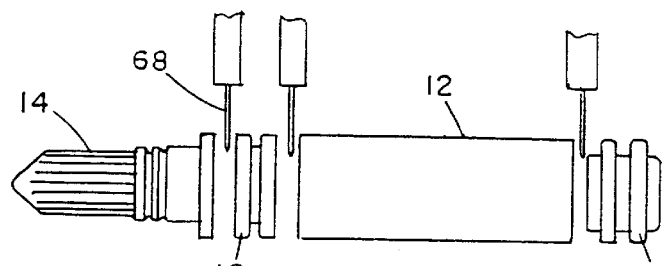
FIG. 10 illustrates the manufacturing step of separating the elements from one another following blow-molding.
Figure 11A:
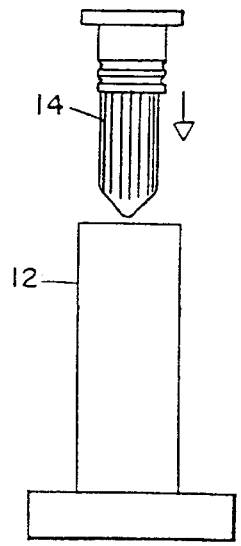
FIGS. 11A–C respectively illustrate the sequence of manufacturing steps that comprise spin-welding the container body to the module body.
Figure 11B:
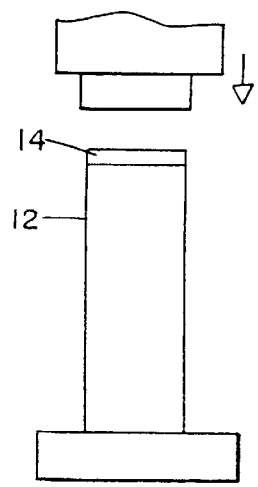
Figure 11C:
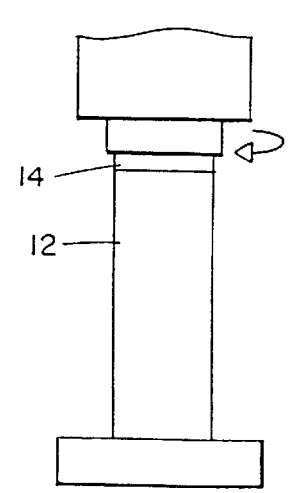

Important to manufacturing economy is that mold 66 is configured to produce one container body 12 and one thermic module body 14 as a single unitarily molded part. As illustrated in FIG. 10, a static trimming machine cuts this part at three places to separate it into container body 12, thermic module body 14, and two moyles 16 and 18. As known in the art, a moyle is excess or scrap material that may be included in a molded part to facilitate molding and handling. The static trimming machine includes rollers (not shown) that bear against moyle 16 and rotate the part, as indicated by the arrow. The machine rotates the part against a hot knife blade 68 that can be extended for cutting and then retracted. Knife blade 68 separates or cuts moyle 16 from the remainder of the part. The same or a similar machine performs a similar cutting operation that separates moyle 18. The use of a static trimming machine is important to the manufacturing process because it leaves a smooth surface at the flange-like end of thermic module portion 14 to facilitate the welding step described below. While the blow-molding and cutting steps are believed to be important steps of the overall manufacturing process described herein, attention should be focused upon the step in which thermic module body 14 is attached to container body 12 by spin-welding, as illustrated in FIGS. 11A–C. Spin-welding is a method familiar to persons of skill in the art, by which the plastic of two parts fuses as a result of friction induced by spinning or rotating one part relative to the other. A suitable spin-welding machine is commercially available from TA Systems of Michigan. As illustrated in FIG. 11A, thermic module body 14 is inserted into the end of container body 12, and the resulting assembly is placed over a cylindrical tubular support (not shown) of the machine. As illustrated in FIG. 11B, the machine has a rotary head that lowers into contact with the flang-like surface of module body 14. The machine applies pressure that maintains module body 14 firmly in contact with container body 12. The head then begins rotating or spinning while maintaining that pressure. The rotating head spins module body 14 with respect to container body 12, which is kept stationary by the support on which it is mounted, as a result of the frictional engagement between the rotating head and the flange-like portion of module body 14. The friction between module body 14 and container body 12 fuses or welds them together. It is significant that pressure is applied before rotation begins and is maintained until the parts have fused because this sequence results in a more precise weld.

Note that the cutting step of the process exposes the cross-section of layers, such as the oxygen and flavor scalping barrier layer, in container body 12 and module body 14. While the layers are very thin and difficult to see with the unaided eye, they are sufficiently exposed that they are susceptible to degradation by atmospheric moisture and oxygen. Spin-welding is highly advantageous because, unlike other potential methods for attaching these parts to one another, spin-welding in the manner described above seals the exposed ends of container body 12 and module body 14, thereby inhibiting atmospheric moisture, oxygen or other contaminants from contacting and consequently degrading the oxygen barrier or other sensitive layers of container body 12. Also, the smooth and square surface left by the rotary cutter is more readily sealed by the spin-welding; spin-welding a jagged or uneven edge may not completely seal the sensitive interior layers.

Outer actuator assembly 42 may be spin-welded to the end of container body 12 as well. The ring of square recesses on its surface (see FIG. 2) facilitates engagement by a spin-welding head having a corresponding ring of square protuberances (not shown).

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. A container for selectably changing the temperature of its contents by mixing two reactants, comprising:

a container body having a material chamber for containing said contents;

a thermic module connected to one end of said container body and extending at least partially into said container body, an opposite end of said container body having a container opening into said material cavity, said thermic module comprising an actuator, a piercing member movable between a retracted position and an extended position in response to a force experienced by a portion of said actuator, a breakable barrier, and two chambers for containing said reactants separated from one another by said breakable barrier, a distal end of said piercing member breaking said breakable barrier when said elongated member is in said extended position to allow mixing of said reactants;

a lid mounted to said opposite end of said container body;

heat-sensitive adhesive adhering said lid to said container body and having an adhesion strength decreasing with an increase in temperature; and said lid having a lid opening and a flange portion, and said flange portion is in substantial contact with a cylindrical portion of said opposite end of said container body, and said lid being rotatable with respect to said container body to align said lid opening with said container opening.

2. The container recited in claim 1, wherein said adhesive maintains substantial adhesion when its temperature is below a predetermined threshold and loses substantial adhesion when its temperature exceeds said predetermined threshold.

3. The container recited in claim 2, wherein said predetermined threshold is approximately 100 degrees Fahrenheit (38 Celsius).

4. The container recited in claim 1, wherein a plurality of patches of said heat-sensitive adhesive are evenly spaced around said flange portion of said lid and said cylindrical portion of said container.

5. A container for selectably changing the temperature of its contents by mixing two reactants, comprising:

a container body having a material chamber for containing said contents;

a thermic module connected to one end of said container body and extending at least partially into said container body, an opposite end of said container body having a container opening into said material cavity, said thermic module comprising an actuator, a piercing member movable between a retracted position and an extended position in response to a force experienced by a portion of said actuator, a breakable barrier, and two chambers for containing said reactants separated from one another by said breakable barrier, a distal end of said piercing member breaking said breakable barrier when said elongated member is in said extended position to allow mixing of said reactants;

a lid mounted to said opposite end of said container body;

heat-sensitive adhesive adhering said lid to said container body and having an adhesion strength decreasing with an increase in temperature;

a plurality of patches of said heat-sensitive adhesive being evenly spaced around said flange portion of said lid and said cylindrical portion of said container; and a plurality of patches of a lubricating agent interspersed with said patches of said heat-sensitive adhesive around said flange portion of said lid and said cylindrical portion of said container.

6. The container recited in claim 5, wherein said adhesive maintains substantial adhesion when its temperature is below a predetermined threshold and loses substantial adhesion when its temperature exceeds said predetermined threshold.

7. The container recited in claim 6, where in s aid predetermined threshold is approximately 100 degrees Fahrenheit (38 Celsius).

8. The container recited in claim 1, wherein said lid is made of plastic.

9. The container recited in claim 8, wherein said lid includes a thermochromic dye.

10. A method for using a container for selectably changing the temperature of its contents by mixing two reactants, comprising the steps of:

preventing a portion of a closure mounted on a container body having a material chamber for containing said contents from being moved by a user with respect to said container body until said contents reach a predetermined temperature;

moving said portion of said closure with respect to said container body until said closure is opened;

consuming said contents through said opened closure;

wherein said container body is cylindrical and has a container opening into said material cavity at one end of said container body; and said lid is rotatably mounted to an opposite end of said container body and has a lid opening and a flange portion in substantial contact with a cylindrical portion of said opposite end of said container body, said lid rotatable to align said lid opening with said container opening.

11. The method for using a container recited in claim 10, wherein said container has a heat-sensitive adhesive adhering a portion of said lid to a portion of said container, and said adhesive has an adhesion strength decreasing with an increase in temperature.

12. The method for using a container recited in claim 11, wherein said container includes a thermic module extending at least partially into said container body, said thermic module comprising an actuator, a piercing member movable between a retracted position and an extended position in response to a force experienced by a portion of said actuator, a breakable barrier, and two chambers for containing said reactants separated from one another by said breakable barrier, a distal end of said piercing member breaking said breakable barrier when said elongated member is in said extended position to allow mixing of said reactants.

13. The method for using a container recited in claim 12, wherein:

said container body is cylindrical and has a container opening into said material cavity at one end of said container body; and said lid is rotatably mounted to an opposite end of said container body and has a lid opening and a flange portion in substantial contact with a cylindrical portion of said opposite end of said container body, said lid rotatable to align said lid opening with said container opening.

* * * * *